United States Patent [19]

Tattersall

[11] 4,363,372

[45] Dec. 14, 1982

[54] GAS-CUSHION VEHICLES

[75] Inventor: Edward G. Tattersall, Southampton, England

[73] Assignee: Vosper Hovermarine Limited, Great Britain

[21] Appl. No.: 151,551

[22] Filed: May 20, 1980

[51] Int. Cl.³ .............................. B60V 1/11; B63B 1/38
[52] U.S. Cl. ................................... 180/118; 180/128; 114/67 A
[58] Field of Search ............... 180/127, 118, 122, 129, 180/128; 114/67 A

[56] References Cited

U.S. PATENT DOCUMENTS

| | | | |
|---|---|---|---|
| 3,174,569 | 3/1965 | Eggington | 180/118 |
| 3,181,638 | 5/1965 | Cockerell | 180/122 X |
| 3,193,215 | 7/1965 | Dunham | 180/122 X |
| 3,261,420 | 7/1966 | Schmidt | 180/122 |
| 3,318,404 | 5/1967 | Hopkins et al. | 180/122 |
| 3,363,718 | 1/1968 | Hammett | 180/128 |
| 3,420,330 | 1/1969 | Bliss | 180/128 |
| 3,559,608 | 2/1971 | Tattersall | 114/67 R |
| 3,575,116 | 4/1971 | Burwell et al. | 180/118 X |
| 3,977,491 | 8/1976 | Fishlock | 180/120 |
| 4,131,174 | 12/1978 | Rickards | 180/118 |

FOREIGN PATENT DOCUMENTS 1075745  7/1967  United Kingdom ................ 180/118

*Primary Examiner*—Joseph Paul Brust
*Attorney, Agent, or Firm*—Steel, Gould & Fried

[57] ABSTRACT

A gas-cushion vehicle is provided with a system for reducing dynamic variations in cushion gas pressure. The system comprises a gas-flow outlet connection between a space occupied by cushion gas and the atmosphere. A flexible wall member of inflatable form is disposed within the connection and is operable so as to allow cushion gas to escape to the atmosphere as cushion pressure tends to increase, and to impede the escape of cushion gas as cushion pressure tends to decrease. The flexible wall member provides a flexible barrier maintaining a pressure differential between the space occupied by cushion gas and the atmosphere. Dynamic variations in cushion pressure will alter this pressure differential and the resistance to the escape of cushion gas offered by the wall member will then alter accordingly, so that, if the cushion pressure rises, the resistance will be too weak to contain this pressure and the wall member will deflect to allow cushion gas to escape through the connection.

12 Claims, 6 Drawing Figures

U.S. Patent  Dec. 14, 1982  Sheet 1 of 2  4,363,372
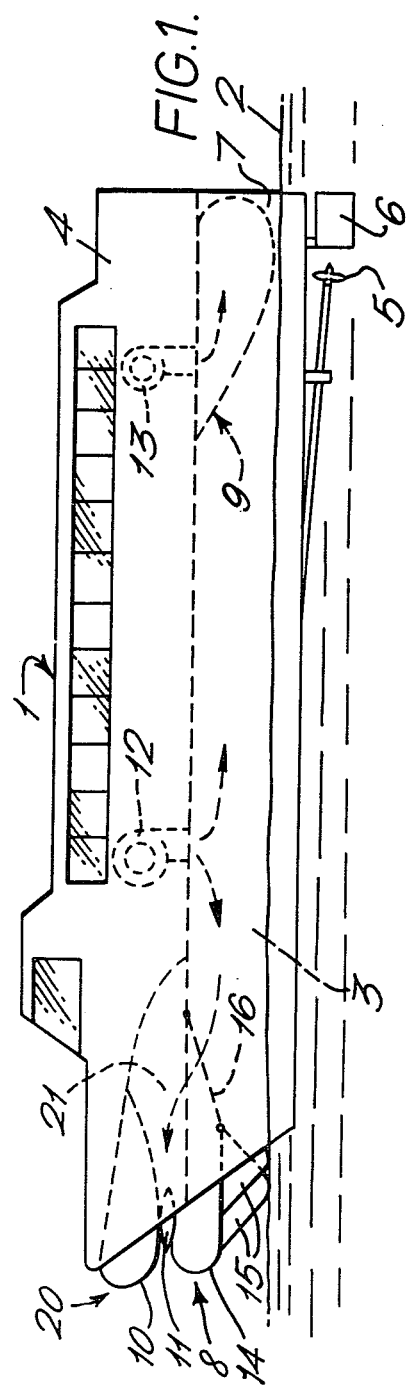
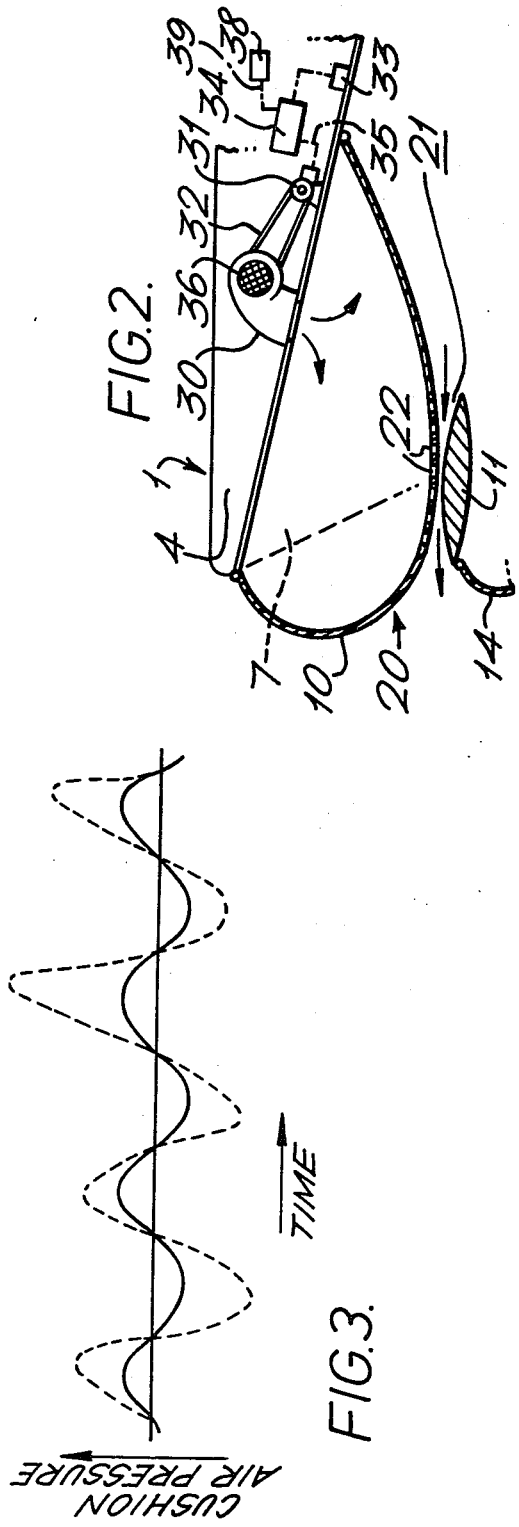
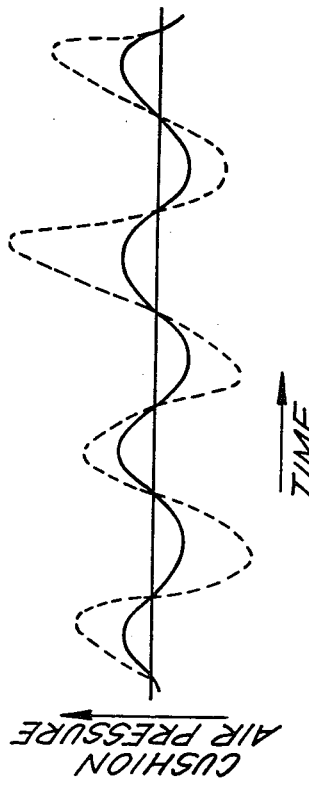

GAS-CUSHION VEHICLES

BACKGROUND TO THE INVENTION

This invention relates to gas-cushion vehicles, that is to say, to vehicles for travelling over a surface and which, in operation, are supported above that surface, at least in part, by a cushion of pressurised gas, for example, air formed and contained between the vehicle body and the surface.

When a gas-cushion vehicle travels over an undulating surface such as rough water or ground, it experiences changes in volume and gas flow and thereby dynamic variations in the pressure of the vehicle-supporting cushion. These variations, unless reduced, result in the application of undesirable forces to the vehicle. cl SUMMARY OF THE INVENTION According to the present invention, a gas-cushion vehicle is provided with means for reducing dynamic variations in cushion gas pressure, said means comprising a gas-flow outlet connection between a space occupied by cushion gas and the atmosphere, and a flexible wall member disposed within the connection and operable so as to allow cushion gas to escape to the atmosphere as cushion pressure tends to increase, and to impede the escape of cushion gas as cushion pressure tends to decrease.

The space occupied by cushion gas is preferably the cushion space beneath the vehicle body but it may also be, for example, a chamber spaced from, but in direct communication with, the cushion space.

The flexible wall member provides a flexible barrier maintaining a pressure differential between the space occupied by cushion gas and the atmosphere. Dynamic variations in cushion pressure will alter this pressure differential and the resistance to the escape of cushion gas offered by the wall member will then alter accordingly, so that, if the cushion pressure rises, the resistance will be too weak to contain this pressure and the wall member will deflect to allow outward passage of cushion gas through the connection. On the other hand, if cushion pressure fails, the resistance of the wall member will increase sufficiently to impede the escape of cushion gas.

Gas-cushion vehicles are often required to operate over surfaces of differing degrees of irregularities. It is therefore desirable to vary the above-mentioned pressure differential.

This may be done by making the flexible wall member of hollow, inflatable form and by providing control means for adjusting the inflation pressure so as to suit operating conditions.

The variation in pressure differential may also be performed in an automatic manner, for example, by providing inflation control means sensitive to dynamic changes in cushion pressure or to dynamic forces applied to the vehicle, and operable to make corresponding changes in wall member inflation pressure.

The flexible wall member is preferably of the form described and claimed in British Pat. No. 1,400,035. (U.S. Pat. No. 3,977,491 of Fishlock corresponds).

The invention may be applied to "sidewall" gas-cushion vehicles. That is to say, to gas-cushion vehicles for travelling over the surface of water, wherein, in operation, the sides of each of their vehicle-supporting cushions are contained by a pair of laterally-spaced "side" wall structures extending longitudinally along the sides of the vehicle body in substantially parallel array and depending therefrom so as to dip into the water and form a cushion-gas seal.

However, the invention may also be applied to other types of gas-cushion vehicles, for example, as described and claimed in British Pat. No. 1,184,062. (U.S. Pat. No. 3,559,608 of Tattersall corresponds).

Such a vehicle comprises a pair of hollow laterally-spaced body structures adapted to carry payload inside of said body structures, structural means extending between the body structures so as to interconnect said body surfaces, a membraneous barrier comprising flexible sheeting means covering the space between the body structures and being sealed to said body structures so as to separate said space from the atmosphere above, and means for forming a vehicle-supporting cushion of pressurized gas within said space.

BRIEF DESCRIPTION OF THE DRAWINGS

Embodiments of the invention will now be described, by way of example, with reference to the accompanying drawings, wherein:

FIG. 1 is a side view of a sidewall gas-cushion vehicle,

FIG. 2 is a fragmentary side view, in medial section and to an enlarged scale, of the bow portion of the vehicle, with added detail, FIG. 3 is a cushion pressure/time graph.

In the figures, like reference numerals refer to like components.

DETAILED DESCRIPTION OF THE PREFERRED EMBODIMENTS

Figure 4:
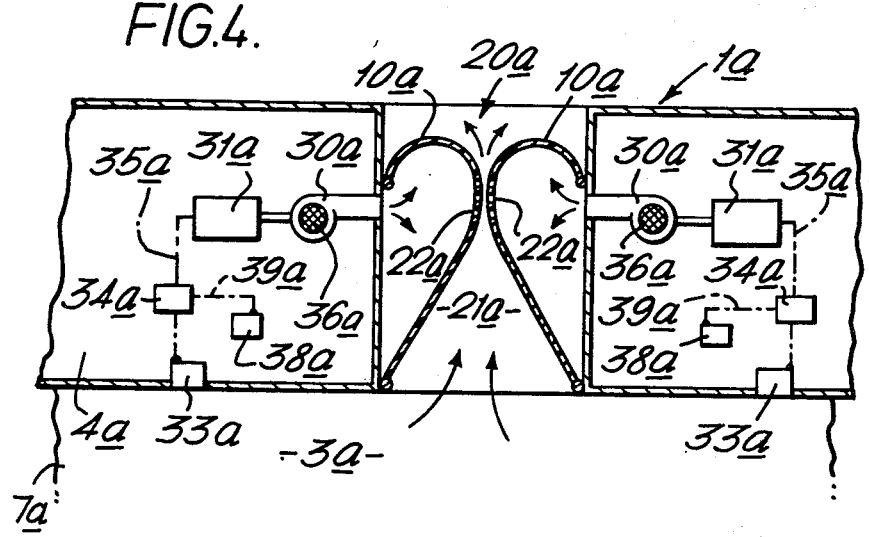
FIGS. 4 and 5 are fragmentary side views, in medial section, of mid-portions of modified forms of the gas-cushion vehicle of FIG. 1.

With reference to FIGS. 1 and 2, a sidewall gas-cushion vehicle 1 is shown travelling over the surface 2 of water, supported by a cushion 3 of pressurized gas (air), formed and contained between the vehicle body 4 and the surface 2. The vehicle 1 is propelled by a pair of waterscrew propellers 5 and is steered by a pair of rudders 6.

The sides of the vehicle-supporting cushion 3 are contained by a pair of laterally-spaced sidewall structures 7 extending longitudinally along the sides of the vehicle body 4 in substantially parallel array. The sidewalls 7 depend from the sides of the vehicle body 4 so as to dip into the water and form a cushion seal. Each sidewall 7 carries a waterscrew propeller 5 and a rudder 6.

The front or bow end of the cushion 3 is contained by a flexible skirt 8 and the rear or stern end thereof by a flexible skirt 9. The skirts 8, 9, which are of hollow, inflatable form, and constructed from rubberised fabric, extend laterally between (and in the case of the skirt 8, beyond as well) the front and rear ends of the sidewalls 7. The skirts 8, 9 are attached to the vehicle body 4 and depend therefrom. The flexible skirt 8 is in light contact with the water surface 2. The inflation and tension forces set up in the flexible skirt 9 ensure that it is maintained clear of, but in close proximity to, the surface 2.

The front flexible skirt 8 is of three-stage form. The upper stage comprises an inflated bag 10 cooperating (as explained hereinafter) with a foil member 11 extending laterally between and connected to the sidewalls 7. The intermediate stage comprises a flexible loop 14, the upper edge of which is attached to the bottom surface, (in this example, the leading edge), of the foil member 11. The lower stage comprises a succession of independently-deflectable flexible wall or skirt members 15 attached to and depending below the loop 14. The skirt members 15 are of the form disclosed by British patent specification No. 1,043,351. (U.S. Pat. No. 3,420,330 of Bliss corresponds). The upper (inner) corners of the skirt members 15 are connected to the vehicle body 4 by tie-cords 16.

Air forming the vehicle-supporting cushion 3 is provided by a pair of centrifugal fans 12 disposed side by side which discharge directly into the space occupied by the cushion 3. Cushion air then enters the loop 14 and skirt members 15 so as to inflate them. The rear flexible skirt 9 is inflated by air supplied by a centrifugal fan 13. The fans 12 and fan 13, which have side-disposed atmospheric air intakes, form separate means for supplying air to the space occupied by the vehicle-supporting cushion 3 and the skirt 9 respectively.

The fans 12, 13 are driven by variable-speed motors (not shown), under the control of the pilot of the vehicle.

In accordance with the invention, and as shown in FIG. 2, the vehicle 1 is provided with means, generally indicated by reference 20, for reducing dynamic variations in cushion air pressure.

The means 20 comprise an air flow outlet connection 21 formed in the bow of the vehicle 1 and extending between the cushion space and the atmosphere, as well as the inflated bag 10 which is disposed in the connection 21 and which serves as a flexible wall member operable to control the escape of cushion air through the connection.

The outlet end of the connection 21 is defined by the foil member 11 and a recessed portion of the vehicle bow. (The escape of air under the foil member 11 is prevented by the loop 14 and skirt members 15).

The means 20 also comprise inflation control means for adjusting inflation pressure of the bag 10. These control means comprise a small size centrifugal fan 30, (FIG. 2 only), which is driven by a variable-speed motor 31, by way of an endless belt 32, so as to inflate the bag 10, the fan 30 having a side-disposed air intake 36, and a pressure transducer 33 sensitive to dynamic changes in cushion pressure. The transducer 33 communicates these dynamic changes, in the form of corresponding electrical signals, to a signal conditioner 34 operable, via electrical signal line 35, to vary the speed of the fan 30 and thus adjust the bag 10/cushion 3 pressure differential.

Means directly sensitive to dynamic forces, for example, heave, applied to the vehicle 1 are also provided. These means comprise an accelerometer 38 connected to the signal conditioner 34 by way of electrical signal line 39.

The bag 10/cushion 3 pressure differential may also be adjusted in accordance with other factors, for example, mixed sea states encountered by the vehicle and/or rate of roll acceleration. Computer-controlled means may be required to make the necessary adjustments.

The bag 10 is of the form described and claimed in the above-mentioned British Pat. No. 1,400,035, that is to say, the lower face of the bag, i.e. the face which is in close proximity to the upper surface of the foil member 11, is made permeable by holes 22. (See FIG. 2). This permeability allows some of the bag inflation air to bleed to atmosphere whereby any tendency for local pressure changes to take place as a result of the Bernoulli effect is suppressed.

In operation, the bag 10 is inflated to a level whereby a controlled escape of cushion air to atmosphere, via the connection 21, takes place between the bag 10 and foil member 11. Dynamic variations in cushion pressure or in forces applied to the vehicle, results in corresponding variations in the pressure differential existing between atmosphere and cushion pressure. This pressure differential causes the bag 10 to deflect whereby excess cushion air is released to atmosphere or a fall in cushion pressure is allowed to build up.

FIG. 3 shows (in full lines) the effect of the means 20. The dotted lines indicate the likely fluctuation in cushion pressure in the event of the means 20 not being present.

The foil member 11 not only provides a cooperating surface for the bag 10, it also serves to apply a restoring movement to the vehicle 1 should it pitch forward into the water surface 2.

The foil member 11 could be of "U"-like form, (when viewed from the front), so as to be adhedral or dihedral. The bag 10 and loop 14 will then be tailored to suit.

The foil member 11 need not remain fixed. It could be made movable, for example, automatically, in order to vary the level of the restoring force.

The foil member 11 could be replaced by other structure, which may or may not serve as a foil. It could, for example, comprise structure of wholly or partially cylindrical form.

The bottom of the bag 10 need not be permeable, but it is preferable to make it so.

The bag 10 need not be provided with its own inflation fan. It could, for example, be inflated by air taken from one or both of the fans 12, using a suitable air tapping arrangement.

Although automatic control over inflation of the bag 10 is preferred, it is not essential.

The means 20 need not be disposed in the bow of the vehicle 1; it could, for example, be disposed at its stern. More than one means 20 may be employed if desirable.

In the modified vehicle 1a of FIG. 4, the means 20a for reducing dynamic variations in cushion air pressure comprise an air flow outlet connection 21a formed in the vehicle body 4a. The connection 21a extends, in a substantially vertical direction, between the cushion space and the atmosphere.

In this modification, two contiguous inflated bags 10a are provided which cooperate with each other so as to control the escape of cushion air through the connection 21a.

In this modification, fans 30a are shaft-driven by variable-speed motors 31a.

Figure 5:
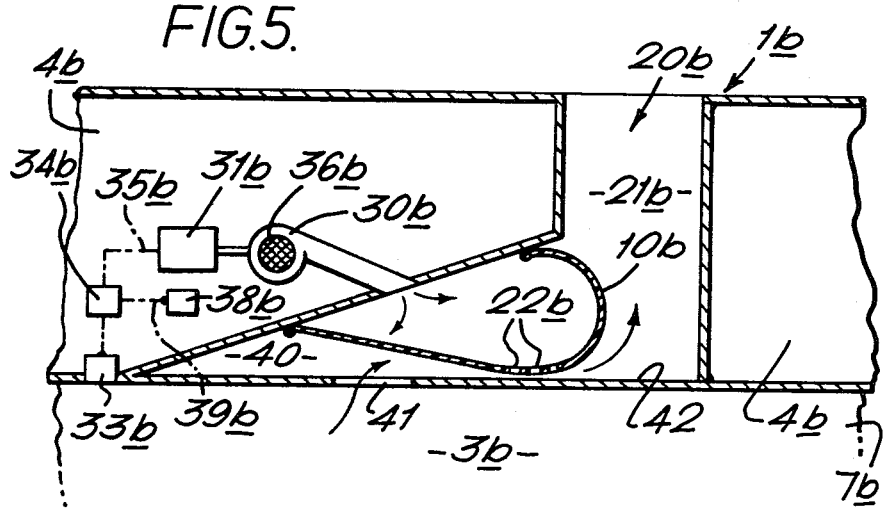

In the modified vehicle 1b of FIG. 5, the means 20b for reducing dynamic variations in cushion air pressure, comprise an air flow outlet connection 21b formed in the vehicle body 4b. The connection 21b extends between a chamber 40 spaced from and in direction communication with, via port 41, the cushion space, and the atmosphere.

In this modification, the inflated bag 10b cooperates with the floor 42 of the chamber 40, so as to control the escape of cushion air through the connection 21b.

The modifications of FIGS. 4 and 5 are particularly suitable for use with gas-cushion vehicles of the types disclosed by the above-mentioned British Pat. No. 1,184,062, where they may be employed to allow cushion gas to escape through a connection formed in the membraneous barriers of the vehicles.

Figure 6:
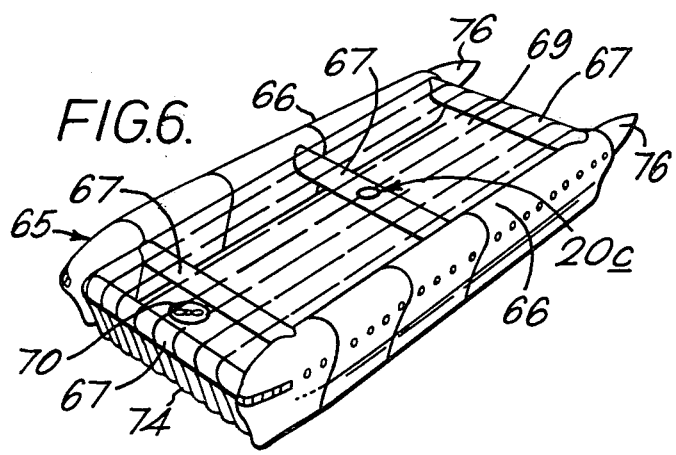
FIG. 6 is a view in perspective of another form of gas-cushion vehicle.

FIG. 6 illustrates such a vehicle. With reference to FIG. 6, a gas-cushion vehicle 65 comprises a laterally-spaced pair of buoyant body structures 66 of hollow, elongated form and of rigid construction, extending longitudinally in substantially parallel array and adapted to carry payload, and structural means in the form of four tubular struts 67 extending laterally between the body structures 66 so as to interconnect the latter. The interiors of the struts 67, 68 provide passageways for connection between the body structures 66 and the foremost pair of the struts 67 also provide access to a centrally-mounted control cabin (not shown). The body structures 66 and struts 67 unite to form a hollow, framelike structure of rigid construction.

A flexible sheet 69 is sealingly attached to the framelike structure so as to cover the space between the body structure and so as to form a membraneous barrier between this space and the atmosphere above, the sheet being subjected to pure tension. Fan means 70 supply pressurized air to the space between the body structures 66 so as to form a vehicle-supporting cushion within the space.

The vehicle 65 is designed for use over water and the body structures 66 are downwardly tapered so as to serve as "sidewalls" in containing the vehicle-supporting cushion by dipping into the water. The ends of the cushion are contained by flexible skirts 74 of the same form as the skirt 15 of FIG. 1.

The vehicle 65 is provided with means 20c disposed in one of the struts 70. In this example the means 20c is substantially identical to the means 20a of FIG. 4. The means 20c could, however, be of substantially the same form as means 20 or 20b of FIGS. 2 and 5 respectively.

The bags 10, 10a, 10b could be replaced by other forms of flexible barriers. For example, by bag plus fluid curtain containment arrangements, as disclosed by British patent specification No. 968,191 (H.D.L.). (See FIGS. 12 and 13 thereof).

I claim:

1. A gas-cushion vehicle provided with a means for forming a vehicle-supporting cushion of pressurized gas between the vehicle body and the surface over which the vehicle travels and provided with a means for containing the vehicle-supporting cushion about its periphery, the vehicle comprising:
   a gas-flow outlet connection through a portion of the vehicle between a space occupied by cushion gas and the atmosphere, the gas-flow outlet connection having a sealing surface; and,
   a flexible, hollow wall member disposed within the outlet connection and inflatable to an operating pressure, the sealing surface of the gas-flow outlet connection and the inflatable member together forming a valve which is automatically operable in response to variations in cushion pressure so as to allow cushion gas to escape to the atmosphere by collapsing when cushion pressure exceeds the operating pressure, and so as to impede the escape of cushion gas by reinflating when cushion pressure falls below the operating pressure, whereby dynamic variations in gas cushion pressure are substantially reduced without disturbing the vehicle-terrain interface.

2. A gas-cushion vehicle as claimed in claim 1, wherein the space occupied by the cushion gas is the cushion space beneath the vehicle body.

3. A gas-cushion vehicle as claimed in claim 1, wherein the space occupied by the cushion gas comprises a chamber spaced from, but in direct communication with, the cushion space beneath the vehicle body.

4. A gas-cushion vehicle as claimed in claim 1, further comprising inflation control means for adjusting the operating pressure of the inflatable wall member.

5. A gas-cushion vehicle as claimed in claim 1, further comprising: inflation control means for adjusting the operating pressure of the inflatable wall member; and, means sensitive to dynamic changes in cushion pressure for operating the control means.

6. A gas-cushion vehicle as claimed in claim 1, further comprising: inflation control means for adjusting the operating pressure of the inflatable wall member; and, means sensitive to dynamic forces applied to the vehicle for operating the control means.

7. A gas-cushion vehicle as claimed in claim 1, wherein the gas-flow outlet connection is disposed within the means for containing the vehicle-supporting cushion and the sealing surface comprises a foil member which, in addition to cooperating with the flexible wall member to control the escape of cushion gas, is so positioned on the vehicle as to provide a lifting force whenever the foil is temporarily submerged.

8. A gas-cushion vehicle as claimed in claim 1, wherein the flexible wall member is disposed within the vehicle body and cooperates with part of said body so as to control the escape of cushion gas.

9. A gas-cushion vehicle as claimed in claim 1, further comprising a pair of laterally-spaced wall structures extending longitudinally along the sides of the vehicle body in substantially parallel array and depending therefrom so as, in operation, to dip into the water and form a seal for the sides of the vehicle-supporting cushion, whereby the vehicle may travel over water.

10. A gas-cushion vehicle as claimed in claim 1, further comprising: a pair of hollow laterally-spaced body structures adapted to carry payload inside of said body structures; structural means extending between the body structures so as to interconnect said body structures; a membraneous barrier comprising flexible sheeting means covering the space between the body structures and being sealed to said body structures so as to separate said space from the atmosphere above; and, means for forming a vehicle-supporting cushion of pressurized gas within said space.

11. A gas-cushion vehicle as claimed in claim 1, wherein the gas-flow outlet connection is disposed within the vehicle body.

12. A gas-cushion vehicle provided with a means for forming a vehicle-supporting cushion of pressurized gas between the vehicle body and the surface over which the vehicle travels and provided with a means for containing the vehicle-supporting cushion about its periphery, the vehicle comrising:
   a gas-flow outlet connection through a portion of the vehicle between a space occupied by cushion gas and the atmosphere; and,
   a pair of flexible, hollow wall members disposed within the outlet connection and inflatable to an operating pressure, the inflatable members together forming a valve which is automatically operable in response to variations in cushion pressure so as to allow cushion gas to escape to the atmosphere by collapsing when cushion pressure exceeds the operating pressure, and so as to impede the escape of cushion gas by reinflating and sealing the gas-flow outlet connection when cushion pressure falls below the operating pressure, whereby dynamic variations in gas cushion pressure are substantially reduced without disturbing the vehicle-terrain interface.

* * * * *